(12) United States Patent
Endoh et al.

(10) Patent No.: US 9,455,465 B2
(45) Date of Patent: Sep. 27, 2016

(54) ELECTROLYTE MEMBRANE FOR POLYMER ELECTROLYTE FUEL CELL, PROCESS FOR ITS PRODUCTION AND MEMBRANE-ELECTRODE ASSEMBLY FOR POLYMER ELECTROLYTE FUEL CELL

(71) Applicant: Asahi Glass Company, Limited, Chiyoda-ku, Tokyo (JP)

(72) Inventors: Eiji Endoh, Yokohama (JP); Shinji Terazono, Yokohama (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 82 days.

(21) Appl. No.: 14/599,121

(22) Filed: Jan. 16, 2015

(65) Prior Publication Data

US 2015/0200412 A1 Jul. 16, 2015

Related U.S. Application Data

(63) Continuation of application No. 11/615,256, filed on Dec. 22, 2006, now Pat. No. 8,962,215, which is a continuation of application No. PCT/JP2005/011466, filed on Jun. 22, 2005.

(30) Foreign Application Priority Data

| Jun. 22, 2004 | (JP) | ................................ 2004-183712 |
| Aug. 2, 2004 | (JP) | ................................ 2004-225706 |
| Sep. 13, 2004 | (JP) | ................................ 2004-265176 |
| Apr. 15, 2005 | (JP) | ................................ 2005-118412 |

(51) Int. Cl.
| H01M 8/10 | (2016.01) |
| C08J 5/22 | (2006.01) |
| H01B 1/12 | (2006.01) |
| H01M 6/18 | (2006.01) |

(52) U.S. Cl.
CPC ........... *H01M 8/1039* (2013.01); *C08J 5/2237* (2013.01); *H01B 1/122* (2013.01); *H01M 8/109* (2013.01); *H01M 8/1023* (2013.01); *H01M 8/1025* (2013.01); *H01M 8/1046* (2013.01); *H01M 8/1051* (2013.01); *H01M 8/1053* (2013.01); *H01M 8/1081* (2013.01); *H01M 8/1088* (2013.01); *H01M 8/1093* (2013.01); *C08J 2327/18* (2013.01); *H01M 6/183* (2013.01); *H01M 2008/1095* (2013.01); *H01M 2300/0082* (2013.01); *H01M 2300/0094* (2013.01); *Y02E 60/521* (2013.01); *Y02P 70/56* (2015.11)

(58) Field of Classification Search
None
See application file for complete search history.

(56) References Cited

U.S. PATENT DOCUMENTS

| 5,472,799 A | 12/1995 | Watanabe |
| 5,840,192 A | 11/1998 | El Moussaoui et al. |
| 5,955,556 A | 9/1999 | McCarthy et al. |
| 6,221,248 B1 | 4/2001 | Lin et al. |
| 6,242,135 B1 | 6/2001 | Mushiake et al. |
| 6,335,112 B1 | 1/2002 | Asukabe et al. |
| 6,630,263 B1 | 10/2003 | McElroy |
| 7,582,713 B2 | 9/2009 | Terada et al. |
| 7,799,468 B2 | 9/2010 | Watakabe et al. |
| 8,546,004 B2 | 10/2013 | Kawazoe et al. |
| 2002/0009626 A1 | 1/2002 | Terazono et al. |
| 2002/0093008 A1 | 7/2002 | Kerres et al. |
| 2003/0008196 A1 | 1/2003 | Wessel et al. |
| 2003/0008198 A1 | 1/2003 | Mukoyama et al. |
| 2004/0043283 A1 | 3/2004 | Cipollini et al. |
| 2004/0112754 A1 | 6/2004 | Thate et al. |
| 2005/0136308 A1 | 6/2005 | Andrews et al. |
| 2005/0227132 A1 | 10/2005 | Hori et al. |
| 2006/0019140 A1 | 1/2006 | Kawazoe et al. |
| 2006/0063055 A1 | 3/2006 | Frey et al. |
| 2006/0063903 A1 | 3/2006 | Kasahara et al. |
| 2006/0099475 A1 | 5/2006 | Watanabe et al. |
| 2006/0099476 A1 | 5/2006 | Watakabe et al. |
| 2006/0159972 A1 | 7/2006 | Nodono |
| 2006/0199063 A1 | 9/2006 | Miura et al. |
| 2006/0280985 A1 | 12/2006 | Toyoda et al. |
| 2007/0099053 A1 | 5/2007 | Frey et al. |

(Continued)

FOREIGN PATENT DOCUMENTS

| DE | 199 46 694 A1 | 6/2000 |
| DE | 101 30 828 A1 | 1/2003 |

(Continued)

OTHER PUBLICATIONS

Banerjee et al,. "Nafion® perfluorinated membranes in fuel cells," Journal of Fluorine Chemistry, 2004, 125:1211-1216.

(Continued)

*Primary Examiner* — Ladan Mohaddes
(74) *Attorney, Agent, or Firm* — Foley & Lardner LLP

(57) ABSTRACT

An electrolyte membrane which comprises a cation exchange membrane made of a polymer having cation exchange groups and contains cerium ions is used as an electrolyte membrane for a polymer electrolyte fuel cell. In a case where the cation exchange membrane has sulfonic acid groups, the sulfonic acid groups are ion-exchanged, for example, with cerium ions so that cerium ions are contained preferably in an amount of from 0.3 to 20% of $-SO_3^-$ groups contained in the cation exchange membrane. A membrane for a polymer electrolyte fuel cell capable of power generation in high energy efficiency, having high power generation performance regardless of the dew point of the feed gas and capable of stable power generation over a long period of time, can be provided.

16 Claims, No Drawings

(56) References Cited

U.S. PATENT DOCUMENTS

| | | | |
|---|---|---|---|
| 2007/0104994 A1 | 5/2007 | Endoh et al. | |
| 2008/0118808 A1 | 5/2008 | Tayanagi et al. | |

FOREIGN PATENT DOCUMENTS

| | | | |
|---|---|---|---|
| EP | 1 271 682 A2 | 1/2003 | |
| EP | 1 662 595 A1 | 5/2006 | |
| EP | 1 772 919 A1 | 4/2007 | |
| JP | 6-103992 A | 4/1994 | |
| JP | 2000-106203 | 4/2000 | |
| JP | 2000-231928 | 8/2000 | |
| JP | 2001-118591 A | 4/2001 | |
| JP | 2001-185164 | 7/2001 | |
| JP | 2002-231268 A | 8/2002 | |
| JP | 2002-260705 A | 9/2002 | |
| JP | 2003-086188 | 3/2003 | |
| JP | 2003-123777 | 4/2003 | |
| JP | 2003-183467 | 7/2003 | |
| JP | 2004-018573 A | 1/2004 | |
| JP | 2004-075978 | 3/2004 | |
| JP | 2004-134294 A | 4/2004 | |
| JP | 2004-183712 A | 7/2004 | |
| JP | 2004-204704 A | 7/2004 | |
| JP | 2004-228192 A | 8/2004 | |
| JP | 2004-260185 | 9/2004 | |
| JP | 2004-265176 A | 9/2004 | |
| JP | 2004-288620 | 10/2004 | |
| JP | 2004-327074 | 11/2004 | |
| JP | 2005-019232 | 1/2005 | |
| JP | 2005-071760 | 3/2005 | |
| JP | 2005-093233 | 4/2005 | |
| JP | 2005-149859 | 6/2005 | |
| JP | 2006-134678 | 5/2006 | |
| JP | 2006-302600 | 11/2006 | |
| JP | 4810868 | 11/2011 | |
| WO | WO 03/083963 A2 | 10/2003 | |
| WO | WO 2004/102714 | 11/2004 | |
| WO | WO 2005/020357 | 3/2005 | |
| WO | WO 2005/041330 A1 | 5/2005 | |
| WO | WO 2005/060039 A1 | 6/2005 | |
| WO | WO-2005/124912 A1 | 12/2005 | |

OTHER PUBLICATIONS

Communication of Notice of Opposition dated Jul. 26, 2011, filed against corresponding European Patent No. 1772919, 18 pages.

Czapski et al., "The kinetics of the oxidation of hydrogen peroxide by Cerium (IV)," Journal of Physical Chemistry, Jan. 1963, 67:201-203.

Ludvigsson et al., "Incorporation and characterization of oxides of manganese, cobalt and lithium onto Nafion 117 membranes," J. Mater. Chem., Feb. 2001, 11:1269-1276.

Mauntz et al., "State of Understanding of Nafion," Chem. Rev., 2004, 104:4535-4585.

New Energy and Industrial Technology Development Organization, "Summary of debrief session for polymer electrolyte fuel cells research and development achievement," 2000, two cover pages and pp. 55-58.

Newcombe et al., "An optical redox chemical sensor based on ferroin immobilized in a Nafion® membrane," Analytica Chimica Acta, 1999, 401:137-144.

Notice of Opposition against EP 05752908.3 (EP 1760812), Sep. 16, 2011, 30 pages.

Notice of Opposition against EP 05753377.0 (EP 1777767), Oct. 5, 2011, 17 pages.

Supplementary European Search Report dated Jan. 24, 2008 (3 pgs.).

ELECTROLYTE MEMBRANE FOR POLYMER ELECTROLYTE FUEL CELL, PROCESS FOR ITS PRODUCTION AND MEMBRANE-ELECTRODE ASSEMBLY FOR POLYMER ELECTROLYTE FUEL CELL

TECHNICAL FIELD

The present invention relates to an electrolyte membrane for a polymer electrolyte fuel cell, whereby the initial output voltage is high, and the high output voltage can be obtained over a long period of time.

BACKGROUND ART

A fuel cell is a cell whereby a reaction energy of a gas as a feed material is converted directly to electric energy, and a hydrogen-oxygen fuel cell presents no substantial effect to the global environment since its reaction product is only water in principle. Especially, a polymer electrolyte fuel cell employing a polymer membrane as an electrolyte, can be operated at room temperature to provide a high power density, as a polymer electrolyte membrane having high ion conductivity has been developed, and thus is expected to be a prospective power source for mobile vehicles such as electric cars or for small cogeneration systems, along with an increasing social demand for an energy or global environmental problem in recent years.

In a polymer electrolyte fuel cell, a proton conductive ion exchange membrane is commonly employed as a polymer electrolyte, and an ion exchange membrane made of a perfluorocarbon polymer having sulfonic acid groups, is particularly excellent in the basic properties. In the polymer electrolyte fuel cell, gas diffusion type electrode layers are disposed on both sides of the ion exchange membrane, and power generation is carried out by supplying a gas containing hydrogen as a fuel and a gas (such as air) containing oxygen as an oxidizing agent to the anode and the cathode, respectively.

In the reduction reaction of oxygen at the cathode of the polymer electrolyte fuel cell, the reaction proceeds via hydrogen peroxide ($H_2O_2$), and it is worried that the electrolyte membrane may be deteriorated by the hydrogen peroxide or peroxide radicals to be formed in the catalyst layer. Further, to the anode, oxygen molecules will come from the cathode through the membrane, and it is worried that hydrogen peroxide or peroxide radicals may be formed at the anode too. Especially when a hydrocarbon membrane is used as the polymer electrolyte membrane, it is poor in the stability against radicals, which used to be a serious problem in an operation for a long period of time.

For example, the first practical use of a polymer electrolyte fuel cell was when it was adopted as a power source for a Gemini space ship in U.S.A., and at that time, a membrane having a styrene/divinylbenzene polymer sulfonated, was used as an electrolyte membrane, but it had a problem in the durability over a long period of time. As a technique to overcome such problems, a method of having a compound with a phenolic hydroxyl group or a transition metal oxide capable of catalytically decomposing hydrogen peroxide incorporated to the polymer electrolyte membrane (see Patent Document 1) or a method of supporting catalytic metal particles in the polymer electrolyte membrane to decompose hydrogen peroxide (see Patent Document 2) is also known. However, such a technique is a technique of decomposing formed hydrogen peroxide, and is not one attempted to suppress decomposition of the ion exchange membrane itself. Accordingly, although at the initial stage, the effect for improvement was observed, there was a possibility that a serious problem would result in the durability over a long period of time. Further, there was a problem that the cost tended to be high.

As opposed to such a hydrocarbon type polymer, an ion exchange membrane made of a perfluorocarbon polymer having sulfonic acid groups as a polymer remarkably excellent in the stability against radicals, has been known. In recent years, a polymer electrolyte fuel cell employing an ion exchange membrane made of such a perfluorocarbon polymer is expected as a power source for e.g. automobiles or housing markets, and a demand for its practical use is increasing, and its developments are accelerated. In such applications, its operation with particularly high efficiency is required. Accordingly, its operation at higher voltage is desired, and at the same time, cost reduction is desired. Further, from the viewpoint of the efficiency of the entire fuel cell system, an operation under low or no humidification is required in many cases.

However, it has been reported that even with a fuel cell employing an ion exchange membrane made of a perfluorocarbon polymer having sulfonic acid groups, the stability is very high in operation under high humidification, but the voltage degradation is significant in operation under low or no humidification conditions (see Non-Patent Document 1). Namely, it is considered that, also in the case of the ion exchange membrane made of a perfluorocarbon polymer having sulfonic acid groups, deterioration of the electrolyte membrane proceeds due to hydrogen peroxide or peroxide radicals in operation under low or no humidification.

Patent Document 1: JP-A-2001-118591
Patent Document 2: JP-A-6-103992
Non-Patent Document 1: Summary of debrief session for polymer electrolyte fuel cells research and development achievement in 2000 sponsored by New Energy and Industrial Technology Development Organization, page 56, lines 16 to 24

DISCLOSURE OF THE INVENTION

Object to be Accomplished by the Invention

Accordingly, for the practical application of a polymer electrolyte fuel cell to e.g. vehicles or housing markets, it is an object of the present invention to provide a membrane for a polymer electrolyte fuel cell, whereby power generation with sufficiently high energy efficiency is possible, high power generation property is achieved, and stable power generation is possible over a long period of time, either in its operation under low or no humidification where the humidification temperature (dew point) of the feed gas is lower than the cell temperature or in its operation under high humidification where humidification is carried out at a temperature close to the cell temperature.

Means to Achieve the Object

The present inventors have conducted extensive studies on fuel cells employing an ion exchange membrane made of a polymer having cation exchange groups, for the purpose of preventing deterioration of the membrane in operation under low or no humidification, and as a result, they have found that deterioration of the electrolyte membrane can be remarkably suppressed by incorporating specific ions into the membrane, and accomplished the invention.

The present invention provides an electrolyte membrane for a polymer electrolyte fuel cell, which comprises a cation exchange membrane made of a polymer having cation exchange groups, characterized by containing cerium ions. Here, the cerium ions may be trivalent or tetravalent, but the valence is not particularly limited in the present invention.

Further, the present invention provides an electrolyte membrane for a polymer electrolyte fuel cell, which comprises a cation exchange membrane having at To least two layers made of a polymer having cation exchange groups laminated, characterized in that at least one of the at least two layers contains cerium ions.

The cerium ions may be present in any state in the electrolyte membrane so long as they are present as ions, and as one embodiment, they may be present in such a state that some of the cation exchange groups in the cation exchange membrane are ion-exchanged with cerium ions. Thus, the present invention further provides an electrolyte membrane for a polymer electrolyte fuel cell, which comprises a cation exchange membrane made of a polymer having cation exchange groups, characterized in that some of the cation exchange groups are ion-exchanged with cerium ions, and an electrolyte membrane for a polymer electrolyte fuel cell, which comprises a cation exchange membrane having at least two layers made of a polymer having cation exchange groups laminated, characterized in that at least one of the at least two layers is a cation exchange membrane in which at least some of the cation exchange groups are ion-exchanged with cerium ions.

The electrolyte membrane of the present invention does not necessarily uniformly contain cerium ions. It may be a cation exchange membrane (laminated membrane) comprising at least two layers, wherein some of the cation exchange groups are ion-exchanged with cerium ions in at least one layer, not in all the layers, i.e. the electrolyte membrane may contain cerium ions non-uniformly in the thickness direction. Therefore, in a case where it is required to increase durability against hydrogen peroxide or peroxide radicals particularly on the anode side, it is possible to employ an ion exchange membrane containing cerium ions only for the layer closest to the anode.

In the present invention, the polymer having cation exchange groups is preferably a polymer having sulfonic acid groups.

Further, the present invention provides a process for producing an electrolyte membrane for a polymer electrolyte fuel cell, which comprises immersing a cation exchange membrane made of a polymer having cation exchange groups in an aqueous solution containing cerium ions.

Further, the present invention provides a membrane-electrode assembly for a polymer electrolyte fuel cell, which comprises an anode and a cathode each having a catalyst layer containing a catalyst and an ion exchange resin, and an electrolyte membrane disposed between the anode and the cathode, characterized in that the electrolyte membrane is the above-described electrolyte membrane.

Still further, the present invention provides a membrane-electrode assembly for a polymer electrolyte fuel cell, which comprises an anode and a cathode each having a catalyst layer containing a catalyst and an ion exchange resin, and an electrolyte membrane disposed between the anode and the cathode, characterized in that the ion exchange resin contained in at least one of the anode and the cathode contains cerium ions.

Effects of the Invention

The electrolyte membrane obtained by the present invention has excellent resistance to hydrogen peroxide or peroxide radicals. The reason is not clear yet, but it is estimated as follows. By incorporation of cerium ions in the electrolyte membrane, particularly by ion-exchange of some of cation exchange groups with cerium ions, the interaction between the cerium ions and a residue after dissociation of protons from the cation exchange groups (such as $—SO_3^-$) effectively improves the resistance of the electrolyte membrane to hydrogen peroxide or peroxide radicals.

Since the electrolyte membrane of the present invention has excellent resistance to hydrogen peroxide or peroxide radicals, a polymer electrolyte fuel cell provided with a membrane-electrode assembly having the electrolyte membrane of the present invention is excellent in durability and capable of generating the electric power stably over a long period of time.

BEST MODE FOR CARRYING OUT THE INVENTION

In the present invention, the polymer having cation exchange groups before incorporation of cerium ions is not particularly limited so long as it has a function to produce protons by dissociation of the cation exchange groups. Specific examples of the cation exchange group include a sulfonic acid group, a sulfonimide group, a phosphonic acid group, a carboxylic acid group and a ketimide group, among which a sulfonic acid group with a strong acidity and high chemical stability is particularly preferred. The present invention will be described below with reference to a polymer having sulfonic acid groups as an example.

The method of incorporating cerium ions into a polymer having sulfonic acid groups to obtain the electrolyte membrane of the present invention is not particularly limited, and the following methods may, for example, be mentioned. (1) A method of immersing a membrane made of a polymer having sulfonic acid groups in a solution containing cerium ions. (2) A method of adding a salt containing a cerium ion to a dispersion of a polymer having sulfonic acid groups to incorporate cerium ions in the dispersion, or mixing a solution containing cerium ions and a dispersion of a polymer having sulfonic acid groups to incorporate cerium ions, and forming a membrane employing the obtained liquid by e.g. cast coating. (3) A method of bringing an organic metal complex salt of cerium into contact with a cation exchange membrane made of a polymer having sulfonic acid groups to incorporate cerium ions.

In the electrolyte membrane obtained by the above method, some of sulfonic acid groups are considered to be ion-exchanged with cerium ions.

The cerium ions may be trivalent or tetravalent, and various cerium salts are used to obtain a solution containing cerium ions. Specific examples of a salt containing trivalent cerium ion include cerium(III) acetate ($Ce(CH_3COO)_3 \cdot H_2O$), cerium(III) chloride ($CeCl_3 \cdot 6H_2O$), cerium (III) nitrate ($Ce(NO_3)_3 \cdot 6H_2O$), cerium(III) sulfate ($Ce_2(SO_4)_3 \cdot 8H_2O$) and cerium(III) carbonate ($Ce_2(CO_3)_3 \cdot 8H_2O$). Specific examples of a salt containing tetravalent cerium ion include cerium(IV) sulfate ($Ce(SO_4)_2 \cdot 4H_2O$), cerium(IV) diammonium sulfate ($Ce(NH_4)_2(NO_3)_6$ and cerium(IV) tetraammonium sulfate ($Ce(NH_4)_4(SO_4)_4 \cdot 4H_2O$). In addition, examples of an organic metal complex salt of cerium include cerium(III) acetylacetonate ($Ce(CH_3COCHCOCH_3)_3 \cdot 3H_2O$). Among them, cerium nitrate and cerium sulfate, which are water soluble and easily handled, are preferred. Further, they are preferred since when the polymer having sulfonic acid groups is subjected to ion exchange by an aqueous solution of either of them, the formed nitric acid or sulfuric acid is easily dissolved in the aqueous solution and removed.

In a case where cerium ions are trivalent for example, when sulfonic acid groups are ion-exchanged with cerium ions, $Ce^{3+}$ is bonded to three $-SO_3^-$, as shown below.

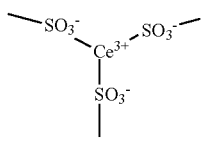

In the present invention, the number of cerium ions contained in the electrolyte membrane is preferably from 0.3 to 20% of the number of $-SO_3^-$ groups in the membrane (hereinafter this ratio will be referred to as the "content of cerium ions"). In a case where a cerium ion completely has the above structure, the above content is the same as the content of sulfonic acid groups ion-exchanged with a cerium ion of from 0.9 to 60% of the total amount of sulfonic acid groups and the sulfonic acid groups ion-exchanged with a cerium ion (hereinafter this ratio will be referred to as the "substitution ratio"). The content of cerium ions is more preferably from 0.7 to 16%, furthermore preferably from 1 to 13%, still more preferably from 1.5 to 12%, especially preferably from 1 to 10%. In terms of the above substitution ratio, it is preferably from 1 to 60%, more preferably from 2 to 50%, furthermore preferably from 3 to 40%, still further preferably from 5 to 30%.

If the content of cerium ions is lower than this range, no adequate stability against hydrogen peroxide or peroxide radicals may be secured. On the other hand, if the content of cerium ions is higher than this range, no adequate conductivity of hydrogen ions may be secured, whereby the membrane resistance may increase to lower the power generation property.

Here, in a case where the electrolyte membrane of the present invention is a laminated membrane, only the proportion of cerium ions to the $-SO_3^-$ groups of the entire electrolyte membrane has to be within the above range, and the content of cerium ions of the layer containing cerium ions itself may be higher than the above range. Further, a method for preparing the laminated membrane is not particularly limited, although it is preferred to prepare a cation exchange membrane containing cerium ions by any one of the above methods (1) to (3) and then laminate it with a cation exchange membrane containing no cerium ions.

Further, when the preferred range of the content of cerium ions is represented by the proportion to the mass of the electrolyte membrane, the mass of cerium to the mass of the entire electrolyte membrane is preferably from 0.02 to 8%, more preferably from 0.05 to 6.6%, furthermore preferably from 0.07 to 5.3%.

In the present invention, the polymer having sulfonic acid groups before incorporation of cerium ions is not particularly limited, but its ion exchange capacity is preferably from 0.5 to 3.0 meq/g dry polymer, more preferably from 0.7 to 2.5 meq/g dry polymer, particularly preferably from 1.0 to 2.5 meq/g dry polymer. If the ion exchange capacity is too low, no satisfactory conductivity of hydrogen ions will be secured when the sulfonic acid groups are ion-exchanged with cerium ions, whereby the membrane resistance will increase to lower the powder generation property. On the other hand, if the ion exchange capacity is too high, the water resistance or the strength of the membrane may decrease. Further, the polymer is preferably a fluoropolymer from the viewpoint of durability, particularly preferably a perfluorocarbon polymer having sulfonic acid groups (which may contain etheric oxygen atom). The perfluorocarbon polymer is not particularly limited, but is preferably a copolymer containing polymerized units based on a perfluorovinyl compound represented by $CF_2=CF-(OCF_2CFX)_m-O_p-(CF_2)_n-SO_3H$ (wherein m is an integer of from 0 to 3, n is an integer of from 1 to 12, p is 0 or 1, and X is a fluorine atom or a trifluoromethyl group) and polymerized units based on tetrafluoroethylene.

Specific preferred examples of the perfluorovinyl compound include compounds represented by the following formulae (i) to (iii). In the following formulae, q is an integer of from 1 to 8, r is an integer of from 1 to 8, and t is an integer of from 1 to 3.

 (i)

 (ii)

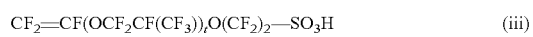 (iii)

In a case where a perfluorocarbon polymer having sulfonic acid groups is used, one obtained by fluorination treatment after polymerization and thereby having terminals of the polymer fluorinated may be used. When the terminals of the polymer are fluorinated, more excellent stability against hydrogen peroxide and peroxide radicals will be achieved, whereby the durability will improve.

Further, the polymer having sulfonic acid groups before incorporation of cerium ions may be one other than a perfluorocarbon polymer having sulfonic acid groups. For example, a polymer having such a structure that it has an aromatic ring in the main chain of the polymer or in the main chain and side chains, and that sulfonic acid groups are introduced to the aromatic ring, and having an ion exchange capacity of from 0.8 to 3.0 meq/g dry polymer, may be preferably used. Specifically, the following polymers may, for example, be used.

Sulfonated polyarylene, sulfonated polybenzoxazole, sulfonated polybenzothiazole, sulfonated polybenzoimidazole, sulfonated polysulfone, sulfonated polyether sulfone, sulfonated polyether ether sulfone, sulfonated polyphenylene sulfone, sulfonated polyphenylene oxide, sulfonated polyphenylene sulfoxide, sulfonated polyphenylene sulfide, sulfonated polyphenylene sulfide sulfone, sulfonated polyether ketone, sulfonated polyether ether ketone, sulfonated polyether ketone ketone, sulfonated polyimide, and so on.

The polymer electrolyte fuel cell provided with the electrolyte membrane of the present invention has, for example, the following structure. Namely, the cell is provided with membrane-electrode assemblies, each of which comprises an anode and a cathode each having a catalyst layer containing a catalyst and an ion exchange resin, disposed on both sides of the electrolyte membrane of the present invention. The anode and the cathode of the membrane-electrode assembly preferably have a gas diffusion layer made of carbon cloth, carbon paper, or the like disposed outside the catalyst layer (opposite to the membrane). Separators having grooves formed to constitute flow paths for a fuel gas or an oxidizing agent gas are disposed on both sides of each membrane-electrode assembly. A plurality of membrane-electrode assemblies are stacked with the separators to form a stack, and a hydrogen gas is supplied to the anode side and an oxygen gas or air to the cathode side. A reaction of $H_2 \rightarrow 2H^+ + 2e^-$ takes place on the anodes, and a reaction of ½O₂+2H⁺+2e⁻→H₂O on the cathodes, whereby chemical energy is converted into electric energy.

Furthermore, the electrolyte membrane of the present invention is also applicable to direct methanol fuel cells in which methanol is supplied instead of the fuel gas to the anode side.

The above-mentioned catalyst layer may be obtained in accordance with conventional methods, for example, as follows. First, a conductive carbon black powder carrying particles of a platinum catalyst or a platinum alloy catalyst, is mixed with a solution of a perfluorocarbon polymer having sulfonic acid groups to obtain a uniform dispersion liquid, and gas diffusion electrodes are formed, for example, by any one of the following methods, thereby obtaining a membrane-electrode assembly.

The first method is a method of coating the both surfaces of the electrolyte membrane with the above-mentioned dispersion liquid, drying it, and then attaching two sheets of carbon cloth or carbon paper closely onto the both sides. The second method is a method of applying the above-mentioned dispersion liquid onto two sheets of carbon cloth or carbon paper, drying it, and then placing the two sheets on both sides of the above ion-exchange membrane so that the surfaces coated with the dispersion liquid is close in contact with the ion-exchange membrane. The carbon cloth or carbon paper herein functions as gas diffusion layers to more uniformly diffuse the gas to the catalyst-containing layers, and functions as current collectors. Furthermore, another available method is such that a substrate separately prepared is coated with the above-mentioned dispersion liquid to make a catalyst layer, such catalyst layers are bonded to an electrolyte membrane by a method such as transcription, then the substrate is peeled off, and the electrolyte membrane is sandwiched between the above-mentioned gas diffusion layers.

There are no particular restrictions on the ion-exchange resin contained in the catalyst layer, and it is preferably a polymer having sulfonic acid groups, more preferably a perfluorocarbon polymer having sulfonic acid groups. The ion-exchange resin in the catalyst layer may contain cerium ions just like the electrolyte membrane of the present invention. Such an ion-exchange resin containing cerium ions can be applied to both anodes and cathodes, and decomposition of the resin can be effectively suppressed, so as to further enhance the durability of the polymer electrolyte fuel cell. Further, an ion-exchange resin containing no cerium ions may be used as the electrolyte membrane so that cerium ions are incorporated only in the ion-exchange resin in the catalyst layer.

In a case where it is desired to incorporate cerium ions into both the ion exchange resin in the catalyst layer and the electrolyte membrane, it is possible, for example, to preliminarily prepare an assembly of a catalyst layer and an electrolyte membrane, and to immerse the assembly into a solution containing cerium ions. Further, in a case where cerium ions are to be contained in the catalyst layer, it is possible to form the catalyst layer by the above method employing, as a coating liquid, one having a catalyst dispersed in a dispersion containing cerium ions and a polymer having sulfonic acid groups. In this case, cerium ions may be contained in either one of the cathode and the anode, or cerium ions may be contained in both the cathode and the anode. Here, the cathode and the anode may be made by using dispersions differing in the content of cerium ions so that the cathode and the anode have different contents of cerium ions. From the viewpoint of improvement in the durability, more preferably, the anode contains from 10 to 30 mol % of cerium ions and the cathode contains from 3 to 10 mol % of cerium ions, relative to the —SO₃⁻ groups contained in the polymer having sulfonic acid groups, whereby decomposition of the ion exchange resin in the catalyst layer can be effectively suppressed.

The electrolyte membrane of the present invention may be a membrane made of only a polymer having sulfonic acid groups, some of which are replaced by cerium ions, but it may contain another component, or it may be a membrane reinforced by e.g. fibers, woven cloth, non-woven cloth or a porous material of another resin such as a polytetrafluoroethylene or a perfluoroalkyl ether. Even in the case of a reinforced membrane, the electrolyte membrane of the present invention can be obtained by immersing a reinforced cation exchange membrane having sulfonic acid groups in a solution containing cerium ions. Further, a method of preparing a membrane by using a dispersion containing a polymer ion-exchanged with cerium ions may also be applicable. In a case where the electrolyte membrane is reinforced, the whole membrane may be reinforced, or the circumference of the membrane may be reinforced in a frame-like shape with a film, a sheet or the like. If the membrane is reinforced in a frame-like shape, the strength around the circumference will increase whereby to improve handling efficiency. The whole membrane may be reinforced with a reinforcing material having a high percentage of void and only the circumference may be reinforced with a reinforcing material having a low percentage of void or having no void.

The polymer electrolyte fuel cell provided with the membrane-electrode assembly of the present invention is excellent in the durability even at high temperature, whereby it can operate at 100° C. or higher to generate the electric power. In a case where the fuel gas is hydrogen obtained by reforming methanol, natural gas, gasoline or the like, if carbon monoxide is contained even in a trace amount, the electrolyte catalyst will be poisoned, and the output of the fuel cell tends to be low. When the operation temperature is at least 100° C., it is possible to suppress the poisoning. The operation temperature is more preferably at least 120° C., whereby the effect of suppressing the poisoning tends to be high.

EXAMPLES

Now, the present invention will be described in further detail with reference to Examples (Examples 1 to 5, 10, 12 to 15) and Comparative Examples (Examples 6 to 9 and 11). However, it should be understood that the present invention is by no means restricted to such specific Examples.

Example 1

As a polymer electrolyte membrane, an ion exchange membrane having a thickness of 50 μm, made of a perfluorocarbon polymer having sulfonic acid groups (Flemion, trade name, manufactured by Asahi Glass Company, Limited, ion exchange capacity: 1.1 meq/g dry polymer) in a size of 5 cm×5 cm (area 25 cm²) was used. The weight of the entire membrane, after being left to stand in dry nitrogen for 16 hours, was measured in dry nitrogen and found to be 0.251 g. The amount of sulfonic acid groups in this membrane is obtained from the following formula:

$$0.251 \text{ (g)} \times 1.1 \text{ (meq/g dry polymer)} = 0.276 \text{ (meq)}$$

Then, 12.0 mg of cerium nitrate (Ce(NO₃)₃·6H₂O) was dissolved in 500 mL of distilled water so that cerium ions (trivalent) in an amount corresponding to 30% of the amount (equivalent) of sulfonic acid groups in this membrane were contained, and the above ion exchange membrane was immersed in the solution, followed by stirring by a stirrer at room temperature for 40 hours to incorporate cerium ions into the ion exchange membrane. The cerium nitrate solution was analyzed by inductively-coupled plasma (ICP) emission spectrometry before and after the immersion and as a result, the content of cerium ions in the ion exchange membrane (the proportion of cerium ions to the number of $—SO_3^-$ groups in the membrane) was found to be 9.3%.

Then, 5.1 g of distilled water was mixed with 1.0 g of a catalyst powder (manufactured by N.E. CHEMCAT CORPORATION) in which platinum was supported on a carbon carrier (specific surface area: 800 $m^2/g$) so as to be contained in an amount of 50% of the whole mass of the catalyst. With this liquid mixture, 5.6 g of a liquid having a $CF_2=CF_2/CF_2=CFOCF_2CF(CF_3)C(CF_2)_2SO_3H$ copolymer (ion exchange capacity: 1.1 meq/g dry polymer) dispersed in ethanol and having a solid content concentration of 9 mass % was mixed. This mixture was homogenized by using a homogenizer (Polytron, trade name, manufactured by Kinematica Company) to obtain a coating fluid for forming a catalyst layer.

This coating fluid was applied by a bar coater on a substrate film made of polypropylene and then dried for 30 minutes in a dryer at 80° C. to obtain a catalyst layer. Here, the mass of the substrate film alone before formation of the catalyst layer and the mass of the substrate film after formation of the catalyst layer were measured to determine the amount of platinum per unit area contained in the catalyst layer, whereupon it was 0.5 $mg/cm^2$.

Then, using the above ion exchange membrane having cerium ions incorporated, catalyst layers formed on the substrate film were disposed on both sides of the membrane and transferred by hot press method to obtain a membrane-catalyst layer assembly having an anode catalyst layer and a cathode catalyst layer bonded to both sides of the ion exchange membrane. The electrode area was 16 $cm^2$.

This membrane-catalyst layer assembly was interposed between two gas diffusion layers made of carbon cloth having a thickness of 350 μm to prepare a membrane-electrode assembly, which was assembled into a cell for power generation, and an open circuit voltage test (OCV test) was carried out as an accelerated test. In the test, hydrogen (utilization ratio: 70%) and air (utilization ratio: 40%) corresponding to a current density of 0.2 $A/cm^2$ were supplied under ordinary pressure to the anode and to the cathode, respectively, the cell temperature was set at 90° C., the dew point of the anode gas was set at 60° C. and the dew point of the cathode gas was set at 60° C., the cell was operated for 100 hours in an open circuit state without generation of electric power, and a voltage change was measured during the period. Furthermore, by supplying hydrogen to the anode and nitrogen to the cathode, amounts of hydrogen gas having leaked from the anode to the cathode through the membrane were analyzed before and after the test, thereby to check the degree of degradation of the membrane. The results are shown in Table 1.

Then, a membrane-electrode assembly was prepared and assembled into a cell for power generation in the same manner as above, and a durability test under operation conditions under low humidification was carried out. The test conditions were as follows. Hydrogen (utilization ratio: 70%)/air (utilization ratio: 40%) was supplied under ordinary pressure at a cell temperature at 80° C. and at a current density of 0.2 $A/cm^2$, and the polymer electrolyte fuel cell was evaluated as to the initial property and durability. Hydrogen and air were so humidified and supplied into the cell that the dew point on the anode side was 80° C. and that the dew point on the cathode side was 50° C., respectively, whereupon the cell voltage at the initial stage of the operation and the relation between the elapsed time after the initiation of the operation and the cell voltage were measured. The results are shown in Table 2. In addition, the cell voltage at the initial state of the operation and the relation between the elapsed time after the initiation of the operation and the cell voltage were also measured in the same manner as above under the above cell evaluation conditions except that the dew point on the cathode side was changed to 80° C. The results are shown in Table 3.

Example 2

In the same manner as in Example 1 except that an aqueous solution having 9.8 mg of cerium sulfate ($Ce_2(SO_4)_3 \cdot 8H_2O$) containing cerium ions (trivalent) dissolved in 500 mL of distilled water is used instead of the cerium nitrate aqueous solution used in Example 1, the same commercially available ion exchange membrane used in Example 1 is treated to obtain a membrane having a content of cerium ions of 9.3%. Using this membrane, in the same manner as in Example 1, a membrane-catalyst layer assembly is obtained and then a membrane-electrode assembly is obtained. The membrane-electrode assembly is evaluated in the same manner as in Example 1, whereupon results shown in Tables 1 to 3 are obtained.

Example 3

In the same manner as in Example 1 except that an aqueous solution having 8.0 mg of cerium nitrate ($Ce(NO_3)_3 \cdot 6H_2O$) dissolved in 500 mL of distilled water was used instead of the cerium nitrate aqueous solution used in Example 1, the same commercially available ion exchange membrane used in Example 1 was treated to obtain a membrane having a content of cerium ions of 6.3%. Using this membrane, in the same manner as in Example 1, a membrane-catalyst layer assembly was obtained and then a membrane-electrode assembly was obtained. The membrane-electrode assembly was evaluated in the same manner as in Example 1, whereupon results shown in Tables 1 to 3 are obtained.

Example 4

In the same manner as in Example 1 except that an aqueous solution having 4.0 mg of cerium nitrate ($Ce(NO_3)_3 \cdot 6H_2O$) dissolved in 500 mL of distilled water is used instead of the cerium nitrate aqueous solution used in Example 1, the same commercially available ion exchange membrane used in Example 1 is treated to obtain a membrane having a content of cerium ions of 3.3%. Using this membrane, in the same manner as in Example 1, a membrane-catalyst layer assembly is obtained and then a membrane-electrode assembly is obtained. The membrane-electrode assembly is evaluated in the same manner as in Example 1, whereupon results shown in Tables 1 to 3 are obtained.

Example 5

As a polymer electrolyte membrane, an ion exchange membrane having a thickness of 50 μm made of a polymer wherein some of sulfonic acid groups of a polyether ether ketone having sulfonic acid groups were ion-exchanged with cerium ions, was prepared as follows. Namely, 60 g of commercially available granular polyether ether ketone (PEEK-450P manufactured by British Victrex Company) was added gradually to 1,200 g of 98% sulfuric acid at room temperature, followed by stirring at room temperature for 60 hours to obtain a uniform solution of a polymer in which sulfonic acid groups were introduced into polyether ether ketone. Then, this solution was gradually dropwise added to 5 L of distilled water under cooling to precipitate the polyether ether ketone having sulfonic acid groups, which was separated by filtration. Then, the separated product was washed with distilled water until the washing liquid became neutral. Thereafter, it was dried under vacuum at 80° C. for 24 hours to obtain 48 g of polyether ether ketone having sulfonic acid groups.

Then, about 1 g of this compound was precisely weighed and immersed in 500 mL of a 1 N sodium chloride aqueous solution and reacted at 60° C. for 24 hours so that protons of the sulfonic acid groups and sodium ions were ion-exchanged. This sample was cooled to room temperature and then sufficiently washed with distilled water, and the sodium chloride aqueous solution after ion exchange and the distilled water used for washing were titrated with 0.01 N sodium hydroxide to determine the ion exchange capacity. The ion exchange capacity was 1.6 meq/g dry polymer.

Then, the polyether ether ketone having sulfonic acid groups was dissolved in N-methyl-2-pyrrolidone (NMP) to obtain a solution of about 10 mass %, which was applied to a substrate made of polytetrafluoroethylene at room temperature by cast coating and dried in a nitrogen atmosphere at 100° C. for 10 hours to evaporate NMP, thereby to obtain a membrane having a thickness of 50 μm. Then, this membrane was cut into a size of 5 cm×5 cm (area 25 cm$^2$), and the weight of the entire membrane was measured in the same manner as in Example 1 and found to be 0.168 g. The amount of the sulfonic acid groups in the membrane is obtained from the following formula:

0.168 (g)×1.6 (meq/g dry polymer)=0.269 (meq)

The above ion exchange membrane is immersed in an aqueous solution having 12.0 mg of cerium nitrate (Ce(NO$_3$)$_3$.6H$_2$O) containing cerium ions (trivalent) corresponding to the amount (equivalent) of about 30% of the amount of sulfonic acid groups in the membrane dissolved in 500 mL of distilled water, followed by stirring by a stirrer at room temperature for 40 hours to obtain a membrane having a content of cerium ions of 10.3%. Then, using this membrane, in the same manner as in Example 1, a membrane-catalyst layer assembly is obtained and then a membrane-electrode assembly is obtained. The membrane-electrode assembly is evaluated in the same manner as in Example 1, whereupon results shown in Tables 1 to 3 are obtained.

Example 6

As a polymer electrolyte membrane, the same commercially available ion exchange membrane used in Example 1 was used without any treatment, and using this membrane, in the same manner as in Example 1, a membrane-catalyst layer assembly was obtained and then a membrane-electrode assembly was obtained. The membrane-electrode assembly was evaluated in the same manner as in Example 1, whereupon results shown in Tables 1 to 3 were obtained.

Example 7

In the same manner as in Example 1, the same commercially available ion exchange membrane used in Example 1 is immersed in an aqueous solution having 9.8 mg of calcium nitrate (Ca(NO$_3$)$_2$.4H$_2$O) containing calcium ions (bivalent) dissolved in 500 mL of distilled water to obtain a membrane having a content of calcium ions of 10.3%. Then, using this membrane, in the same manner as in Example 1, a membrane-catalyst layer assembly is obtained and then a membrane-electrode assembly is obtained. The membrane-electrode assembly is evaluated in the same manner as in Example 1, whereupon results shown in Tables 1 to 3 are obtained.

Example 8

In the same manner as in Example 1, the same commercially available ion exchange membrane used in Example 1 is immersed in an aqueous solution having 10.3 mg of copper sulfate (CuSO$_4$.5H$_2$O) containing copper ions (bivalent) dissolved in 500 mL of distilled water to obtain a membrane having a content of copper ions of 9.7%. Then, using this membrane, in the same manner as in Example 1, a membrane-catalyst layer assembly is obtained and then a membrane-electrode assembly is obtained. The membrane-electrode assembly is evaluated in the same manner as in Example 1, whereupon results shown in Tables 1 to 3 are obtained.

Example 9

In the same manner as in Example 5 except that the ion exchange membrane made of polyether ether ketone having sulfonic acid groups obtained in Example 5 is used without treatment with cerium ions, a membrane-catalyst layer assembly is obtained and then a membrane-electrode assembly is obtained. The membrane-electrode assembly is evaluated in the same manner as in Example 1, whereupon results shown in Tables 1 to 3 are obtained.

Example 10

In the same manner as in Example 1 except that an aqueous solution having 6.0 mg of cerium nitrate (Ce(NO$_3$)$_3$.6H$_2$O) dissolved in 500 mL of distilled water was used instead of the cerium nitrate aqueous solution used in Example 1, the same commercially available ion exchange membrane used in Example 1 was treated to obtain a membrane having a content of cerium ions of 4.7%. Then, using this membrane, in the same manner as in Example 1, a membrane-catalyst layer assembly was obtained.

The membrane-catalyst layer assembly was interposed between two gas diffusion layers made of carbon cloth having a thickness of 350 μm to prepare a membrane-electrode assembly, which was assembled into a cell for power generation, and a durability test under operation conditions under low humidification at 120° C. was carried out as follows. Hydrogen (utilization ratio: 50%)/air (utilization ratio: 50%) were supplied to the anode and to the cathode under an elevated pressure of 200 kPa at a cell temperature of 120° C. at a current density of 0.2 A/cm$^2$, and the polymer electrolyte fuel cell was evaluated as to the initial property and durability. Hydrogen and air were so humidified and supplied into the cell that the dew point on the anode side was 100° C. and that the dew point on the cathode side was 100° C., respectively, whereupon the cell voltage at the initial stage of the operation and the relation between the elapsed time after the initiation of the operation and the cell voltage were measured. The results are shown in Table 4.

Example 11

As a polymer electrolyte membrane, the same commercially available ion exchange membrane used in Example 1 was used without any treatment, and using this membrane, in the same manner as in Example 1, a membrane-catalyst layer assembly was obtained and then a membrane-electrode assembly was obtained. The membrane-electrode assembly was evaluated in the same manner as in Example 10, whereupon the power generation voltage suddenly decreased to about 0 V after 110 hours and power generation could be no more possible. After the test, the membrane was taken out and examined and as a result, a large pore was formed on the membrane, which was found to be the cause of the sudden decrease in the voltage.

(Preparation of Solution of Perfluorocarbon Polymer Having Sulfonic Acid Groups)

300 g of a 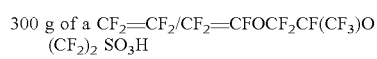copolymer (ion exchange capacity: 1.1 meq/g dry polymer), 420 g of ethanol and 280 g of water were charged into a 2 L autoclave, sealed hermetically, and mixed at 105° C. for 6 hours by means of a double helical blade to obtain a uniform liquid (hereinafter referred to as "liquid A"). The solid content concentration of the liquid A was 30 mass %.

(Preparation of Solution of Perfluorocarbon Polymer Having Sulfonic Acid Groups Containing Cerium Ions)

100 g of the liquid A and 1.00 g of cerium carbonate hydrate ($Ce_2(CO_3)_3 \cdot 8H_2O$) were charged into a 300 mL round-bottomed flask made of glass and stirred at room temperature for 8 hours by a meniscus blade made of polytetrafluoroethylene (PTFE) Bubbles due to generation of $CO_2$ were generated from the start of stirring, and a uniform transparent liquid composition (hereinafter referred to as liquid B) was finally obtained. The solid content concentration of the liquid B was 30.2 mass %.

The content of cerium ions of the liquid B was examined as follows. The above liquid B was applied to a 100 μm ethylene-tetrafluoroethylene copolymer (ETFE) sheet (AFLEX100N, trade name, manufactured by Asahi Glass Company, Limited) by cast coating with a die coater, preliminarily dried at 80° C. for 10 minutes and dried at 120° C. for 10 minutes and further annealed at 150° C. for 30 minutes to obtain an electrolyte membrane having a thickness of 50 μm. From this electrolyte membrane, a membrane having a size of 5 cm×5 cm was cut out and left to stand in dry nitrogen for 16 hours, and its mass was measured. Then, it was immersed in a 0.1 N aqueous HCl solution to obtain a liquid into which cerium ions were completely extracted. This liquid was subjected to ICP emission spectrometry to quantitatively determine cerium in the electrolyte membrane. As a result, the amount of cerium ions was 1.5% based on the mass of the membrane, and the content of cerium ions was 10% based on the number of $-SO_3^-$ groups contained in the perfluorocarbon polymer.

Example 12

The above liquid A is applied to a 100 μm ETFE sheet by cast coating with a die coater, preliminarily dried at 80° C. for 10 minutes and dried at 120° C. for 10 minutes and further annealed at 150° C. for 30 minutes to obtain an electrolyte membrane having a thickness of 25 μm. Similarly, the above liquid B is applied on a 100 μm ETFE sheet by cast coating with a die coater, preliminarily dried at 80° C. for 10 minutes and dried at 120° C. for 10 minutes, and further annealed at 150° C. for 30 minutes to obtain an electrolyte membrane having a thickness of 25 μm and a content of cerium ions of 10%. Then, these membranes are hot pressed at 150° C. to obtain a polymer electrolyte composite membrane having a thickness of 50 μm in which the content of cerium ions is non-uniform in the thickness direction.

Then, 5.1 g of distilled water is mixed with 1.0 g of a catalyst powder (manufactured by N.E. CHEMCAT CORPORATION) in which platinum is supported on a carbon carrier (specific surface area: 800 $m^2$/g) so as to be contained in an amount of 50% of the whole mass of the catalyst. With this liquid mixture, 5.6 g of a liquid having the above liquid A diluted with ethanol to a solid content concentration of 9 mass % is mixed. This mixture is homogenized by using a homogenizer to prepare a coating liquid for forming a catalyst layer.

This coating liquid is applied by a bar coater on a substrate film made of polypropylene and then dried for 30 minutes in a dryer at 80° C. to prepare a catalyst layer. Here, the mass of the substrate film alone before formation of the catalyst layer and the mass of the substrate film after formation of the catalyst layer are measured to determine the amount of platinum per unit area contained in the catalyst layer, whereupon it is 0.5 mg/$cm^2$.

Then, using the above composite membrane, the catalyst layer formed on the substrate film is disposed as an anode on the membrane containing cerium ions and the catalyst layer formed on the substrate film is disposed as a cathode on the membrane containing no cerium ions, and these catalyst layers are transferred by hot press method to prepare a membrane-catalyst layer assembly having an anode catalyst layer and a cathode catalyst layer bonded to both sides of the ion exchange membrane. The electrode area is 16 $cm^2$.

Using this membrane-catalyst layer assembly, in the same manner as in Example 1, a membrane-electrode assembly is obtained. The membrane-electrode assembly is subjected to an open circuit voltage test in the same manner as in Example 1, whereupon results are as shown in Table 1.

Then, the membrane-electrode assembly is prepared as mentioned above and assembled into a cell for power generation, and a durability test is carried out under operation conditions under low humidification at high temperature in the same manner as in Example 10. Namely, the test conditions are as follows. Hydrogen (utilization ratio: 50%)/air (utilization ratio: 50%) are supplied to the anode and to the cathode under an elevated pressure of 200 kPa at a cell temperature of 120° C. and at a current density of 0.2 A/$cm^2$, and the polymer electrolyte fuel cell is evaluated as to the initial property and durability. Hydrogen and air are so humidified and supplied into the cell that the dew point on the anode side is 100° C. and that the dew point on the cathode side is 100° C., respectively, whereupon the cell voltage at the initial stage of the operation and the relation between the elapsed time after the initiation of the operation and the cell voltage are measured. The results are shown in Table 4.

Then, the membrane-electrode assembly is further prepared as mentioned above and assembled into a cell for power generation, and a durability test is carried out under operation conditions under high humidification in the same manner as in Example 1. Namely, the test conditions are as follows. Hydrogen (utilization ratio: 70%)/air (utilization ratio: 40%) are supplied under ordinary pressure at a cell temperature of 80° C. and at a current density of 0.2 A/$cm^2$, and the polymer electrolyte fuel cell is evaluated as to the initial property and durability. Hydrogen and air are so humidified and supplied into the cell that the dew point on the anode side is 80° C. and that the dew point on the cathode side is 80° C., respectively, whereupon the cell voltage at the initial stage of the operation and the relation between the elapsed time after the initiation of the operation and the cell voltage are measured. The results are shown in Table 3.

Example 13

The liquid A was applied on a 100 μm ETFE sheet by cast coating with a die coater, preliminarily dried at 80° C. for 10 minutes and dried at 120° C. for 10 minutes, and further annealed at 150° C. for 30 minutes to obtain an electrolyte membrane having a thickness of 50 μm and a size of 5 cm×5 cm.

Then, 5.1 g of distilled water was mixed with 1.0 g of a catalyst powder (manufactured by N.E. CHEMCAT CORPORATION) in which platinum was supported on a carbon carrier (specific surface area: 800 m$^2$/g) so as to be contained in an amount of 50% of the whole mass of the catalyst. With this liquid mixture, 5.6 g of a liquid having the above liquid B diluted with ethanol to a solid content concentration of 9 mass % was mixed. This mixture was homogenized by using a homogenizer to obtain a coating fluid for forming an anode catalyst layer.

This coating fluid was applied by a bar coater on a substrate film made of polypropylene and then dried for 30 minutes in a dryer at 80° C. to prepare an anode catalyst layer containing cerium ions in an amount of 10 mol % based on —$SO_3^-$ groups contained in the perfluorocarbon polymer in the catalyst layer. Here, the mass of the substrate film alone before formation of the catalyst layer and the mass of the substrate film after formation of the catalyst layer were measured to determine the amount of platinum per unit area contained in the catalyst layer, whereupon it was 0.5 mg/cm$^2$.

Separately, a cathode catalyst layer containing no cerium ions was prepared in the same manner as preparation of the anode catalyst layer except that the above liquid A was used instead of the liquid B.

Then, the anode catalyst layer and the cathode catalyst layer each formed on the substrate film were disposed on both sides of the electrolyte membrane prepared by using the liquid A, and the catalyst layers were transferred to the membrane by hot press method to obtain a membrane-catalyst layer assembly having an anode catalyst layer containing cerium ions in an amount of 10 mol % of —$SO_3^-$ groups contained in the perfluorocarbon polymer in the catalyst layer and a cathode catalyst layer containing no cerium ions bonded to both sides of the polymer electrolyte membrane. The electrode area was 16 cm$^2$.

Using the membrane-catalyst layer assembly, a membrane-electrode assembly was obtained in the same manner as in Example 1. The membrane-electrode assembly was subjected to an open circuit voltage test in the same manner as in Example 1. The results are shown in Table 1. Further, a membrane-electrode assembly is prepared in the same manner as mentioned above and assembled into a cell for power generation, and a durability test under operation conditions under low humidification and under high humidification is carried out, whereupon results are as shown in Tables 2 and 3.

Example 14

In the same manner as the above preparation of the liquid B except that the amount of cerium carbonate hydrate ($Ce_2(CO_3)_3 \cdot 8H_2O$) was 2.00 g, a liquid having a content of cerium ions of 20% based on the number of —$SO_3^-$ groups contained in the perfluorocarbon polymer was obtained. Then, in the same manner as in Example 13 except that this liquid was used for formation of the anode catalyst layer, a membrane-catalyst layer assembly having an anode catalyst layer containing cerium ions in an amount of 20 mol % of —$SO_3^-$ groups contained in the perfluorocarbon polymer in the catalyst layer and a cathode catalyst layer containing no cerium ions bonded to both sides of the polymer electrolyte membrane, was obtained.

Using the membrane-catalyst layer assembly, a membrane-electrode assembly was obtained in the same manner as in Example 1. The membrane-electrode assembly was subjected to an open circuit voltage test in the same manner as in Example 1. The results are shown in Table 1. Further, a membrane-electrode assembly is obtained in the same manner as mentioned above and assembled into a cell for power generation, and a durability test under operation conditions under low humidification and under high humidification is carried out, whereupon results are as shown in Tables 2 and 3.

Example 15

A membrane-catalyst layer assembly was obtained in the same manner as in Example 13 except that an anode catalyst layer containing no cerium ions was prepared by using the liquid A. This membrane-catalyst layer assembly was immersed in an aqueous solution containing cerium nitrate ($Ce(NO_3)_3 \cdot 6H_2O$) to obtain a membrane-catalyst layer assembly having some of sulfonic acid groups in the perfluorocarbon polymer of the membrane and the catalyst layer ion-exchanged with cerium ions. The ion exchange was carried out as follows.

First, the weight of the entire membrane prepared by cast coating, after being left to stand in dry nitrogen for 16 hours, was measured in dry nitrogen and found to be 0.251 g. The amount of sulfonic acid groups in this membrane is obtained from the following formula:

0.251 (g)×1.1 (meq/g dry polymer)=0.276 (meq)

Then, 12.0 mg of cerium nitrate ($Ce(NO_3)_3 \cdot 6H_2O$) was dissolved in 500 mL of distilled water so that cerium ions (trivalent) in an amount corresponding to 10% of the number of sulfonic acid groups in the membrane portion of this membrane-catalyst layer assembly were contained. The above membrane-catalyst layer assembly was immersed in the solution, followed by stirring by a stirrer at room temperature for 40 hours so that some of the sulfonic acid groups in the perfluorocarbon polymer in the membrane-catalyst layer assembly were ion-exchanged with cerium ions and that cerium ions were incorporated in the entire membrane-catalyst layer assembly. The cerium nitrate solution was analyzed by ICP emission spectrometry before and after the immersion and as a result, it was found that the membrane-catalyst layer assembly contained cerium ions in an amount of 9.3% of the number of —$SO_3^-$ groups in the membrane portion of the membrane-catalyst layer assembly.

Using this membrane-catalyst layer assembly, in the same manner as in Example 1, a membrane-electrode assembly was obtained. The membrane-electrode assembly was subjected to an open circuit voltage test in the same manner as in Example 1. The results are as shown in Table 1. Further, a membrane-electrode assembly is prepared in the same manner as mentioned above and assembled into a cell for power generation, and a durability test is carried out under operation conditions under low humidification and under high humidification in the same manner as in Example 1, whereupon the results are as shown in Tables 2 and 3.

TABLE 1

|  | Open circuit voltage (V) | | Hydrogen leak (ppm) | |
|---|---|---|---|---|
|  | Initial | After 100 hours | Initial | After 100 hours |
| Ex. 1 | 0.99 | 0.98 | 710 | 720 |
| Ex. 2 | 0.99 | 0.99 | 700 | 710 |
| Ex. 3 | 0.98 | 0.96 | 730 | 780 |
| Ex. 4 | 0.97 | 0.94 | 750 | 790 |
| Ex. 5 | 0.96 | 0.92 | 850 | 1,100 |
| Ex. 6 | 0.96 | 0.75 | 1,100 | 12,000 |
| Ex. 7 | 0.96 | 0.71 | 850 | 22,000 |
| Ex. 8 | 0.96 | 0.60 | 900 | 35,000 |
| Ex. 9 | 0.94 | 0.51 | 1,300 | 70,000 |
| Ex. 12 | 0.99 | 0.96 | 710 | 720 |
| Ex. 13 | 0.99 | 0.96 | 710 | 720 |
| Ex. 14 | 0.99 | 0.98 | 700 | 710 |
| Ex. 15 | 0.99 | 0.99 | 720 | 720 |

TABLE 2

|  | Initial output voltage (V) | Durability/output voltage (V) | |
|---|---|---|---|
|  |  | After 500 hours | After 2,000 hours |
| Ex. 1 | 0.77 | 0.77 | 0.76 |
| Ex. 2 | 0.77 | 0.76 | 0.76 |
| Ex. 3 | 0.76 | 0.75 | 0.75 |
| Ex. 4 | 0.76 | 0.75 | 0.74 |
| Ex. 5 | 0.75 | 0.73 | 0.72 |
| Ex. 6 | 0.77 | 0.70 | 0.65 |
| Ex. 7 | 0.75 | 0.66 | 0.60 |
| Ex. 8 | 0.75 | 0.62 | 0.55 |
| Ex. 9 | 0.73 | 0.58 | 0.50 |
| Ex. 13 | 0.77 | 0.76 | 0.75 |
| Ex. 14 | 0.77 | 0.76 | 0.76 |
| Ex. 15 | 0.75 | 0.74 | 0.73 |

TABLE 3

|  | Initial output voltage (V) | Durability/output voltage (V) | |
|---|---|---|---|
|  |  | After 500 hours | After 2,000 hours |
| Ex. 1 | 0.78 | 0.78 | 0.78 |
| Ex. 2 | 0.78 | 0.78 | 0.77 |
| Ex. 3 | 0.78 | 0.77 | 0.77 |
| Ex. 4 | 0.78 | 0.77 | 0.77 |
| Ex. 5 | 0.76 | 0.75 | 0.74 |
| Ex. 6 | 0.77 | 0.73 | 0.70 |
| Ex. 7 | 0.76 | 0.71 | 0.67 |
| Ex. 8 | 0.76 | 0.70 | 0.64 |
| Ex. 9 | 0.74 | 0.65 | 0.60 |
| Ex. 12 | 0.78 | 0.77 | 0.76 |
| Ex. 13 | 0.78 | 0.77 | 0.76 |
| Ex. 14 | 0.78 | 0.77 | 0.76 |
| Ex. 15 | 0.77 | 0.76 | 0.76 |

TABLE 4

|  | Initial output voltage (V) | Durability/output voltage (V) | |
|---|---|---|---|
|  |  | After 500 hours | After 2,000 hours |
| Ex. 10 | 0.77 | 0.73 | 0.68 |
| Ex. 11 | 0.76 | Power generation impossible | Power generation impossible |
| Ex. 12 | 0.76 | 0.72 | 0.66 |

It was confirmed from the above results of Examples and Comparative Examples that the open circuit voltage test (OCV test) under high temperature and low humidification conditions as an acceleration test resulted in deterioration of the conventional electrolyte membranes and increase of hydrogen leak due to hydrogen peroxide or peroxide radials formed on the anode and the cathode, but exhibited the dramatically excellent durability of the electrolyte membrane of the present invention.

INDUSTRIAL APPLICABILITY

The electrolyte membrane of the present invention is very excellent in durability against hydrogen peroxide or peroxide radicals formed by power generation of a fuel cell. Accordingly, a polymer electrolyte fuel cell provided with a membrane-electrode assembly having the electrolyte membrane of the present invention has durability over a long period of time either in power generation under low humidification and in power generation under high humidification and even in power generation at a high temperature of at least 100° C.

The entire disclosures of Japanese Patent Application No. 2004-183712 filed on Jun. 22, 2004, Japanese Patent Application No. 2004-225706 filed on Aug. 2, 2004, Japanese Patent Application No. 2004-265176 filed on Sep. 13, 2004 and Japanese Patent Application No. 2005-118412 filed on Apr. 15, 2005 including specifications, claims, drawings and summaries were incorporated herein by reference in their entireties.

What is claimed is:

1. A polymer electrolyte fuel cell, which comprises an electrolyte membrane comprising a cation exchange membrane made of a polymer having sulfonic acid groups as cation exchange groups, characterized by containing cerium ions in an amount of from 0.3 to 20 mol % of the number of $—SO_3^-$ groups contained in the cation exchange membrane.

2. A polymer electrolyte fuel cell, which comprises an electrolyte membrane comprising a cation exchange membrane made of a polymer having sulfonic acid groups as cation exchange groups, characterized in that some of the cation exchange groups are ion-exchanged with cerium ions in an amount of from 0.3 to 20 mol % of the number of $—SO_3^-$ groups contained in the cation exchange membrane.

3. A polymer electrolyte fuel cell, which comprises an electrolyte membrane comprising a cation exchange membrane having at least two layers made of a polymer having sulfonic acid groups as cation exchange groups laminated, characterized in that at least one of the at least two layers contains cerium ions in an amount of from 0.3 to 20 mol % of the number of $—SO_3^-$ groups contained in the cation exchange membrane.

4. A polymer electrolyte fuel cell, which comprises an electrolyte membrane comprising a cation exchange membrane having at least two layers made of a polymer having sulfonic acid groups as cation exchange groups laminated, characterized in that at least one of the at least two layers is a cation exchange membrane in which at least some of the cation exchange groups are ion-exchanged with cerium ions in an amount of from 0.3 to 20 mol % of the number of $—SO_3^-$ groups contained in the cation exchange membrane.

5. The polymer electrolyte fuel cell according to claim 1, wherein the polymer having sulfonic acid groups is a perfluorocarbon polymer having sulfonic acid groups.

6. The polymer electrolyte fuel cell according to claim 5, wherein the perfluorocarbon polymer is a copolymer containing polymerized units based on a perfluorovinyl compound represented by $CF_2=CF-(OCF_2CFX)_m-O_p-(CF_2)_m-SO_3H$ (wherein m is an integer of from 0 to 3, n is an integer of from 1 to 12, p is 0 or 1, and X is a fluorine atom or a trifluoromethyl group) and polymer-ized units based on tetrafluoroethylene.

7. The polymer electrolyte fuel cell according to claim 1, wherein the polymer having sulfonic acid groups has such a structure that it has an aromatic ring in the main chain of the polymer or in the main chain and side chains, and that sulfonic acid groups are introduced to the aromatic ring, and has an ion exchange capacity of from 0.8 to 3.0 meq/g dry polymer.

8. The polymer electrolyte fuel cell according to claim 1, which is a reinforced electrolyte membrane.

9. A process for producing the polymer electrolyte fuel cell as defined in claim 1, which comprises immersing a cation exchange membrane made of a polymer having cation exchange groups in an aqueous solution containing cerium ions.

10. The process for producing the polymer electrolyte fuel cell according to claim 9, wherein the aqueous solution containing cerium ions is an aqueous cerium nitrate solution or an aqueous cerium sulfate solution.

11. A polymer electrolyte fuel cell, which comprises a membrane-electrode assembly comprising an anode and a cathode each having a catalyst layer containing a catalyst and an ion exchange resin, and an electrolyte membrane disposed between the anode and the cathode, characterized in that the electrolyte membrane is the electrolyte membrane as defined in claim 1.

12. The polymer electrolyte fuel cell according to claim 11, wherein the ion exchange resin contained in at least one of the anode and the cathode contains cerium ions.

13. A polymer electrolyte fuel cell, which comprises a membrane-electrode assembly comprising an anode and a cathode each having a catalyst layer containing a catalyst and an ion exchange resin, and an electrolyte membrane disposed between the anode and the cathode, characterized in that the electrolyte membrane is the electrolyte membrane as defined in claim 2.

14. The polymer electrolyte fuel cell according to claim 13, wherein the ion exchange resin contained in at least one of the anode and the cathode contains cerium ions.

15. A polymer electrolyte fuel cell, which comprises a membrane-electrode assembly comprising an anode and a cathode each having a catalyst layer containing a catalyst and an ion exchange resin, and an electrolyte membrane disposed between the anode and the cathode, characterized in that the electrolyte membrane is the electrolyte membrane as defined in claim 3.

16. The polymer electrolyte fuel cell according to claim 15, wherein the ion exchange resin contained in at least one of the anode and the cathode contains cerium ions.

* * * * *